Nov. 19, 1935.  J. A. BAUER  2,021,538
BRAKE OPERATING MEANS FOR TRAILERS
Filed April 4, 1935   2 Sheets-Sheet 2

Inventor
J. A. Bauer

By Clarence A. O'Brien
Attorney

Patented Nov. 19, 1935

2,021,538

UNITED STATES PATENT OFFICE 2,021,538

BRAKE OPERATING MEANS FOR TRAILERS

John Adam Bauer, Mansfield, Ohio

Application April 4, 1935, Serial No. 14,710

8 Claims. (Cl. 188—142)

This invention relates to a novel device in the form of an attachment for trailers and the like wherein said means is especially constructed for the purpose of applying the brakes on the trailer wheels, said means being constructed in particular for coordination with the lead or power vehicle so that when the latter vehicle is brought to a stop, the brakes on the trailer will be promptly applied in a safe and smooth manner.

It goes without saying that I am aware of the fact that it is not broadly new in this line of endeavor to provide mechanical means for operating hydraulic and mechanical brakes on trailers hitched to various forms of powering cars and the like. It follows, therefore, that in reducing the present invention to practice, I have perfected what I believe to be a novel association and arrangement of parts calculated to transmit motion in a positive and efficient manner from the lead vehicle to the brakes of the companion trailer to accomplish the desired results.

The means constituting the novelty of the invention is embodied in and made a part of the draft or coupling connection between the lead vehicle and trailer so as not to interfere with the normal propulsion of the trailer. The embodiment of the structure is such, however, to exert a desired rearward thrust action on the motion transmitting means of the trailer brake structure in such a manner that as the power vehicle is brought to a stop under its own braking power, and as the trailer tends to ride forward in the direction of the then stopped power vehicle, the invention comes into play automatically to apply the trailer brakes.

As will be evident from the accompanying drawings and descriptive matter, it is my primary aim to generally improve upon prior art inventions of this general classfication by providing an assemblage of features in part calculated to enable the desired results to be attained with requisite satisfaction and dependability to the extent that the invention is not only aptly fitted for the purposes intended but susceptible of receiving endorsements and approval by the trade.

Other features and advantages will become more readily apparent from the following description and drawings.

Figure 1:
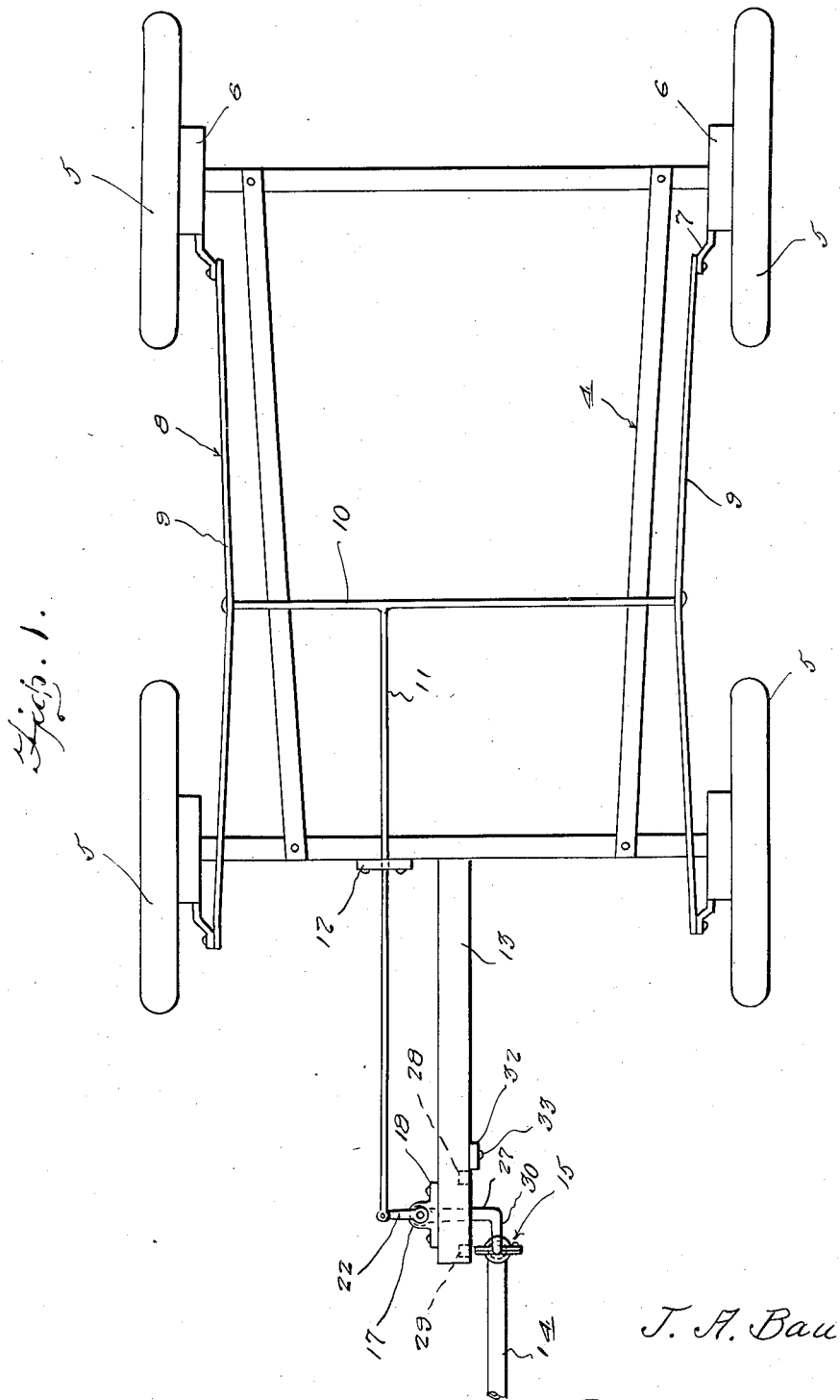
Figure 1 is a top plan view showing the chassis of a conventional type of trailer and disclosing in particular the improved structure or means for applying the brakes of said trailer under the aforementioned predetermined conditions.
Figures 2, 3:
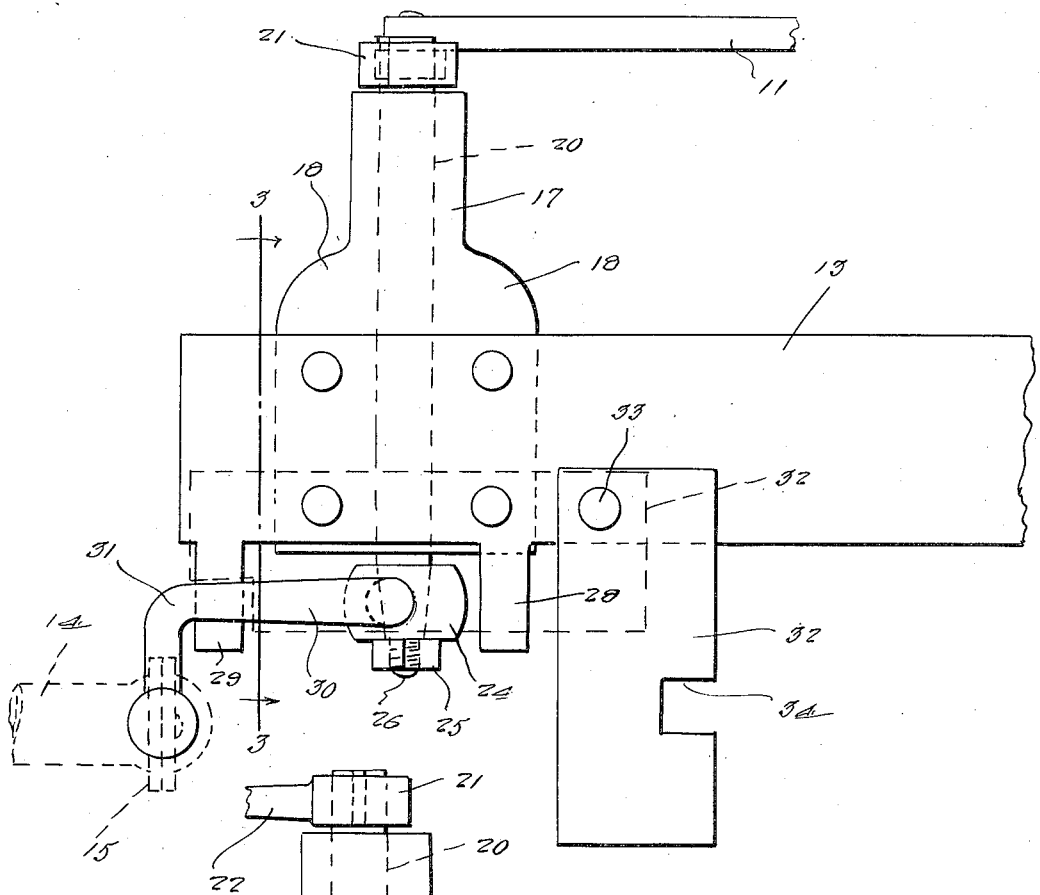
Figure 2 is an enlarged side elevational view of the essential details of the improvement.
Figure 3 is a section taken on the plane of the line 3—3 of Figure 2 looking in the direction of the arrows.

By way of introduction, it is to be pointed out that I have not attempted to show any particular style or type of powering or lead vehicle. Nor have I attempted to disclose a particular form of trailer. On the contrary I have merely illustrated in a diagrammatic way the chassis of the trailer, this being denoted generally in Figure 1 by the numeral 4. The wheels are indicated at 5, the brake drums at 6 and the cranks for operating the brake shoes are denoted by the numerals 7. Incidentally it is immaterial whether the trailer has hydraulic brakes or mechanical brakes. In the arrangement depicted in Figure 1, a four wheel brake assembly is illustrated, though the invention is equally well adapted for so-called two wheel brake structures. In either instance I provide a simple adapter frame 8 which includes longitudinal side members 9 attached at their opposite ends to the brake operating members 7. A connecting or tie rod 10 is suitably attached to the frame members 9 and is equipped with a forwardly extending reciprocatory or push-pull shaft 11. For sake of rigidity this extends through a suitable guide 12 on the frame bar and forwardly along side of and in approximate parallelism to the draft tongue 13 on the trailer. The complemental draft bar 14 which is attached to the power vehicle (not shown) is joined through the instrumentality of a ball and socket joint 15 to the tongue as well as the intervening or correlated means for actuating the frame 8 through the instrumentality of the shaft 11. Broadly this means may be a motion transmitting as well as a coupling device and it is therefore especially constructed to adequately fulfill the requirements of both purposes. Consequently, it may be briefly referred to as the operating connection between the draft tongue 13 and bar 14, as well as the motion transmitting means for the supplementary brake operating frame on the trailer. Referring in particular to Figures 2 and 3 it will be observed that this unique coupling and transmitting unit comprises a vertical tube which constitutes a bearing and the primary part of the attaching device or mounting 16. This part 16 is in the form of a single casting and includes the vertical bearing or tube 17 and attaching flanges 18 bolted or otherwise secured as at 19 to the draft tongue 13. Mounted for oscillation in the bearing is a spindle 20. Attached through the instrumentality of an eye 21 to the upper end of the spindle is a crank arm 22 which is in turn pivotally connected with the forward or adjacent end of the push-pull shaft 11. Attached to the lower tapered end 23 of the same spindle, at a point below the bearing 17 is a three-way bell-crank or coupling unit. This includes an eye 24 secured by a nut 25 to the lower threaded end 26 of the spindle. Extending transversely to the line of draft and beneath the tongue 13 is the three-way unit 27. This swings back and forth in a horizontal plane between the depending stationary stops 28 and 29 on said tongue. It then has a forwardly extending portion or arm 30 which is normally in a position in alignment with the longitudinal dimension of the trailer, that is parallel to the tongue and the portion 30 as a depending terminal 31 carrying a ball joint forming a part of the aforementioned ball and socket joint 15. Incidentally the term "three-way" is merely used to cover in a collective sense the three portions 27, 30 and 31 which form the differently directed portions of the bell crank, as a unit.

In practice, it is evident that when the lead vehicle is brought to a stop by applying its brakes in the usual way, and as the trailer tends to ride up on said lead vehicle it naturally brings into play the bell crank unit. This oscillates the spindle 20 which in turn actuates the crank arm 22, thus exerting a forward pull on the frame 8 to apply the brakes on the trailer.

Under certain conditions it is desired to throw the brake operating means of the trailer out of play. This is to say, when the lead vehicle (not shown) is thrown into reverse for the purpose of backing the trailer in conjunction therewith, it is evident that it is not desired to apply the trailer brakes. Under the circumstances, I provide a simple latch plate 32, this being pivoted as at 33 on one side of a tongue 13 adjacent the lower bell crank. This plate has a keeper notch 34 which is releasably engageable with said bell crank for the purpose of locking it against swinging movement. Under the circumstances, whenever it is desired to throw the brake applying means of the trailer out of play, the latch is releasably hooked to the bell crank.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

Having thus described the invention, what is claimed as new is:

1. In a structure of the class described, in combination, a trailer vehicle including a brake equipped wheel supported chassis, a horizontally disposed actuating frame for the trailer brake including a forwardly extending push-pull shaft, said chassis having a forwardly extending draft tongue, a bearing mounted on said tongue, a spindle mounted for oscillation in said bearing, a crank attached to the upper end of said spindle and pivotally attached to the adjacent forward end of said push-pull shaft, and a crank connected to the lower end of the spindle for oscillating it, said crank being fashioned for operating connection with draft connecting means cooperable with a companion lead vehicle.

2. In a structure of the class described, in combination, a trailer vehicle including a brake equipped wheel supported chassis, a horizontally disposed actuating frame for the trailer brake including a forwardly extending push-pull shaft, said chassis having a forwardly extending draft tongue, a bearing mounted on said tongue, a spindle mounted for oscillation in said bearing, a crank attached to the upper end of said spindle and pivotally attached to the adjacent forward end of said push-pull shaft, a crank connected to the lower end of the spindle for oscillating it, said crank being fashioned for operating connection with draft connecting means cooperable with a companion lead vehicle, said draft tongue being provided with depending longitudinally spaced stop elements between which a portion of said last named crank has limited swinging movement, and a pivoted retaining latch on said tongue engageable with said last named crank in the manner and for the purposes described.

3. An attachment for operating the brakes of a trailer comprising an operating frame, a coupling bracket attachable to a part of the chassis of the trailer and including a vertical tubular bearing, a spindle mounted for oscillation in said bearing, a crank arm connected to the upper end of the spindle and having pivotal operating connection with said frame, a second crank arm connected to the lower end of said spindle, said second named crank arm having its outer end depending and formed with a ball joint connector for cooperation with a socket coupling on the adjacent rear end of a part of the draft means on an associated powering vehicle.

4. In a structural combination of the class described, a trailer including a wheel supported chassis, said wheels being provided with conventional brake structures having operating members, an adapter frame including spaced parallel longitudinal members attached to said brake members, a connecting rod between said longitudinal frame members, a forwardly projecting horizontally disposed operating shaft connected with said connecting rod, said chassis frame having a forwardly directed draft tongue formed adjacent its front with depending longitudinally spaced stop elements, a bracket secured to one side of the tongue and including a vertical bearing, a spindle mounted for oscillation in said bearing, a crank arm on the upper end of said spindle pivotally connected with the forward end of said shaft, a second crank arm attached to the lower end of said spindle and workable between said stop elements, said second named crank arm being fashioned for operating connection with draft means on the complemental power vehicle, and a pivoted latch on said tongue engageable with said second named crank arm to lock it against movement when it is desired to render the trailer brake operating means ineffective.

5. In a structure of the class described, a trailer including a wheel supported chassis, said wheels being provided with conventional brakes, horizontal reciprocatory frame attached to and controlling the actuation of said brakes, said frame including a forwardly projecting push-pull operating shaft, said chassis including a draft tongue formed with longitudinally spaced stop elements, a bracket secured to said tongue, said bracket including a vertical bearing, a spindle mounted for oscillation in said bearing, said spindle being provided at its top with a crank arm, said push-pull shaft extending alongside of said tongue being pivotally attached at its forward end to said crank arm, a second motion transmitting crank arm connected to the lower end of said spindle and workable back and forth between said stop elements, said last named crank arm having a depending forward end portion terminating in a ball joint element, a draft rod adapted for connection with the lead vehicle and having a socket at its inner end connected with said ball joint element, and a pivoted latch plate on said tongue engageable, under predetermined conditions with said second named crank arm to lock it against swinging movement.

6. In a structure of the class described, a trailer vehicle including a draft tongue, an attaching fixture mounted on said tongue, a spindle mounted for limited oscillation on said fixture, a crank attached to the upper end of said spindle and adapted for connection with trailer brake operating means, and a crank connected to the lower end of the spindle for oscillating it, said last named crank being constructed for operating connection with the associated draft connecting means of a complemental lead or power vehicle.

7. In a structure of the class described, a trailer vehicle including a draft tongue provided on its underside with a stop element, a bearing equipped bracket attached to said tongue adjacent said stop element, a spindle mounted for oscillation in said bearing, a motion transmitting crank attached to the upper end of said spindle independently of the bracket, and a second crank detachably connected with the lower end of the spindle and extending transversely beneath said tongue and cooperable with said stop element when moved in one direction, said second named crank being provided with means to facilitate its connection with draft connecting means on a companion power supply vehicle.

8. An attachment for the draft tongue of a trailer vehicle including a bracket provided with a vertical tubular bearing and attaching flanges, a spindle mounted for oscillation in said bearing and having its ends projecting beyond the adjacent ends of said bearing, a motion transmitting crank arm attached to the upper end of said spindle, the lower end of said spindle being tapered and formed with a retaining nut, a second crank arm having its inner end formed with an attaching eye removably secured to the tapered end of the spindle through the instrumentality of said nut, the opposite end of said crank being constructed for operating connection with brake applying means on a companion lead or power vehicle.

JOHN ADAM BAUER.